United States Patent
Lu et al.

(10) Patent No.: US 7,920,592 B2
(45) Date of Patent: Apr. 5, 2011

(54) METHOD OF BANDWIDTH CONTROL AND BANDWIDTH CONTROL DEVICE

(75) Inventors: Chia Sheng Lu, Hsinchu (TW); Sam Chu, Jhonghe (TW)

(73) Assignee: Lantiq Deutschland GmbH, Neubiberg (DE)

( * ) Notice: Subject to any disclaimer, the term of this patent is extended or adjusted under 35 U.S.C. 154(b) by 925 days.

(21) Appl. No.: 11/642,238

(22) Filed: Dec. 20, 2006

(65) Prior Publication Data

US 2008/0151920 A1 Jun. 26, 2008

(51) Int. Cl.
*H04J 3/16* (2006.01)
*H04J 3/18* (2006.01)

(52) U.S. Cl. .................................. 370/468; 370/477

(58) Field of Classification Search .................. None
See application file for complete search history.

(56) References Cited

U.S. PATENT DOCUMENTS

| | | | |
|---|---|---|---|
| 5,231,633 | A | 7/1993 | Hluchyj et al. |
| 5,742,765 | A * | 4/1998 | Wong et al. ............ 709/230 |
| 6,516,369 | B1 | 2/2003 | Bredin |
| 6,920,111 | B1 * | 7/2005 | Zhang et al. ............ 370/235 |
| 7,110,359 | B1 | 9/2006 | Acharya |
| 2002/0126683 | A1 | 9/2002 | Ahlfors et al. |
| 2003/0120705 | A1 | 6/2003 | Chen et al. |
| 2004/0017825 | A1 | 1/2004 | Stanwood et al. |
| 2004/0092278 | A1 | 5/2004 | Diepstraten et al. |
| 2006/0083226 | A1 | 4/2006 | Cahn |
| 2006/0098680 | A1 | 5/2006 | Kelesoglu et al. |
| 2006/0176807 | A1 | 8/2006 | Wu et al. |
| 2007/0104210 | A1 * | 5/2007 | Wu et al. ............... 370/412 |

* cited by examiner

*Primary Examiner* — Salman Ahmed
*Assistant Examiner* — Sori A Aga
(74) *Attorney, Agent, or Firm* — Eschweiler & Associates, LLC (57) ABSTRACT

A method of bandwidth control and a corresponding bandwidth control device are disclosed, in which a plurality of queues are provided, bandwidth is assigned to each of the queues on the basis of a strict priority scheme, and additional bandwidth is assigned to the queues on the basis of a fair queuing scheme.

17 Claims, 5 Drawing Sheets

```
IF (q3 > 0 AND spc3 > 0)
    THEN state: = spq3

ELSE IF (q2 > 0 AND spc2 > 0)
    THEN state: = spq2

ELSE IF (q1 > 0 AND spc1 > 0)
    THEN state: = spq1

ELSE IF (q0 > 0 AND spc0 > 0)
    THEN state: = spq0

ELSE IF (q3 > 0 AND fqc3 > 0 AND fqc3>fqc2 AND fqc3>fqc1 AND fqc3>fqc0)
    THEN state: = fqq3

ELSE IF (q2 > 0 AND fqc2 > 0 AND fqc2>fqc3 AND fqc2>fqc1 AND fqc2>fqc0)
    THEN state: = fqq2

ELSE IF (q1 > 0 AND fqc1 > 0 AND fqc1>fqc3 AND fqc1>fqc2 AND fqc1>fqc0)
    THEN state: = fqq1

ELSE IF (q0 > 0 AND fqc0 > 0 AND fqc0>fqc3 AND fqc0>fqc2 AND fqc0>fqc1)
    THEN state: = fqq0

ELSE : state: = idle
```

METHOD OF BANDWIDTH CONTROL AND BANDWIDTH CONTROL DEVICE

BACKGROUND OF THE INVENTION

The present invention generally relates to a method of bandwidth control, e.g. in a communication device or in a data processing device, and to a bandwidth control device.

In many communication devices, only a single data port is provided for transmitting different data types. In such situations, the different types of data need to be transmitted via the data port and a communication link connected thereto. However, even though there is only a single data port for the differing types of data, specific applications using the data port may require a specific level or quality of service. Thus, a method of controlling the bandwidth for the communication device must be implemented. Prior attempts at controlling the bandwidth have often provided unsatisfactory results.

SUMMARY OF THE INVENTION

A method of bandwidth control and a corresponding bandwidth control device are disclosed, in which a plurality of queues are provided, bandwidth is assigned to each of the queues on the basis of a strict priority scheme, and additional bandwidth is assigned to the queues on the basis of a fair queuing scheme.

DETAILED DESCRIPTION OF THE INVENTION

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described hereinafter.

It is to be understood that in the following detailed description of exemplary embodiments any shown or described direct connection or coupling between two functional blocks, devices, components, or other physical or functional units could also be implemented by indirect connection or coupling. Further, it is to be understood that the described methods and devices could be implemented in hardware, in software, or a combination thereof.

Figure 1:
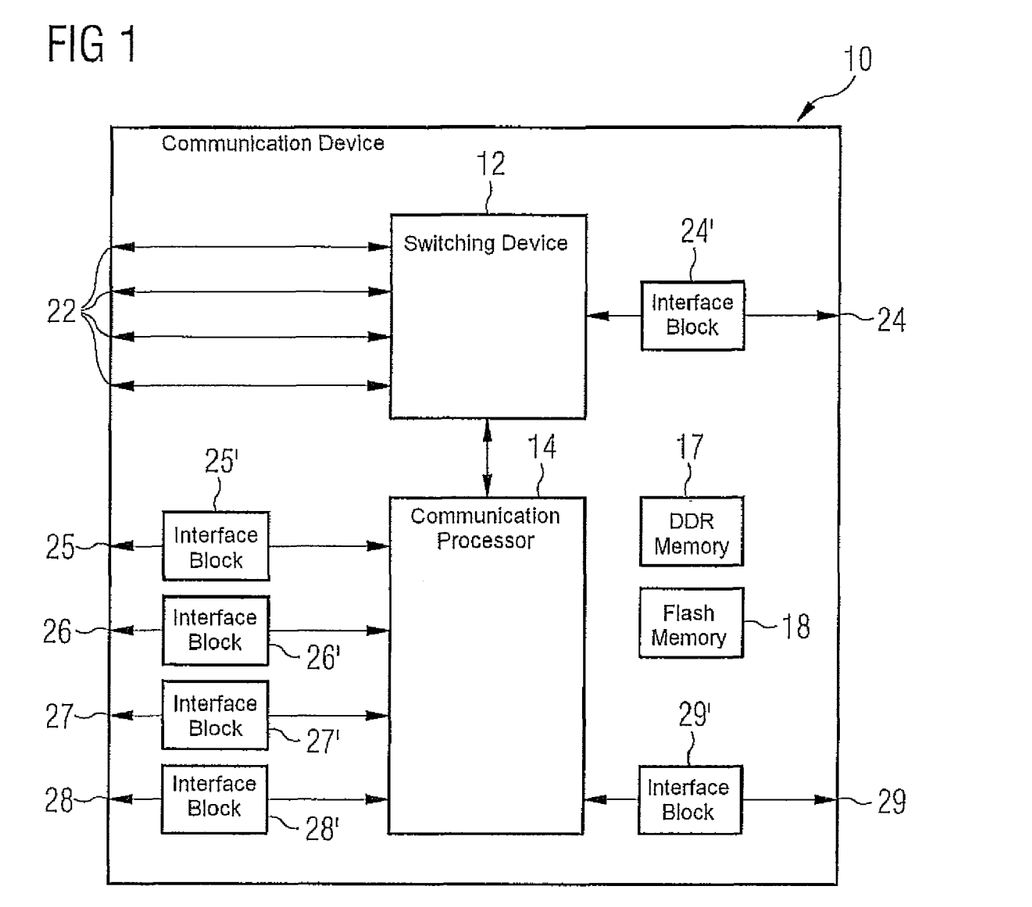
FIG. 1 is a schematic representation of a communication device implementing a bandwidth control method according to an embodiment of the invention.

FIG. 1 schematically illustrates a combined data and voice communication device 10 according to an exemplary embodiment of the invention. The communication device 10 comprises a communication processor 14, which is adapted for wired and wireless Voice over Internet Protocol (VoIP) router applications. The communication processor 14 supports a plurality of interfaces 25, 26, 27, 28, 29. According to an embodiment, the interfaces comprise a universal serial bus interface 25, an analog subscriber line interface card interface 26, a wireless local area network interface 27, an interface for a wireless telephone handset, e.g. according to the DECT specification, and an interface 29 with respect to the public switched telephone network. To each of the interfaces, a corresponding interface block 25', 26', 27', 28', 29' is assigned. Each of the interfaces may constitute a data port to communicate with external devices.

The communication device 10 further comprises a switching device 12 which is coupled to the communication processor 14 to allow for the transfer of data therebetween. The switching device 12 comprises a plurality of data ports 22, which may be implemented according to the Fast Ethernet specification, for connection to a local area network, and a data port 24 for connecting to a wide area network. An interface block 24' is assigned to the data port 24.

The communication device 10 further comprises a memory device, e.g. on the basis of a DDR-RAM memory 17 or on the basis of a flash memory 18.

In general, different types of data are transferred by the communication device 10. These types of data may comprise VoIP data packets, i.e. voice data, and other internet protocol (IP) data packets. In order to provide for acceptable voice communication characteristics, specific quality of service requirements exist for the VoIP data packets. For other IP packets there may be no quality of service requirements or the quality of service requirements may be less strict. In the following, the situation of a data transmission via the data port 24 will be considered. However, similar considerations may also apply with respect to other interfaces or data ports, of the communication device 10 which are used to transmit different types of data, e.g. the data ports 22 or the interfaces 25, 26, 27, 28, 29.

As can be taken from FIG. 1, only a single data port 24 is provided with respect to the wide area network. Accordingly, the different types of data all have to be transmitted via the data port 24 and a communication link connected thereto, e.g. an xDSL communication link such as a VDSL communication link. This is accomplished by assigning the different types of data, e.g. VoIP data packets and IP data packets, to corresponding queues and by arbitrating the access of the queues to the data port 24 by applying a bandwidth control method.

According to an embodiment, the communication device 10 implements a method of bandwidth control which is based on processing a plurality of queues using two scheduling levels. In a first scheduling level, a strict priority scheme is applied. By using the strict priority scheme, a guaranteed bandwidth can be provided. In a second scheduling level, a fair queuing scheme is applied. The fair scheduling scheme provides fair access of the queues to any additional available bandwidth. Detailed implementations of the bandwidth control method will be further described below.

Figure 2:
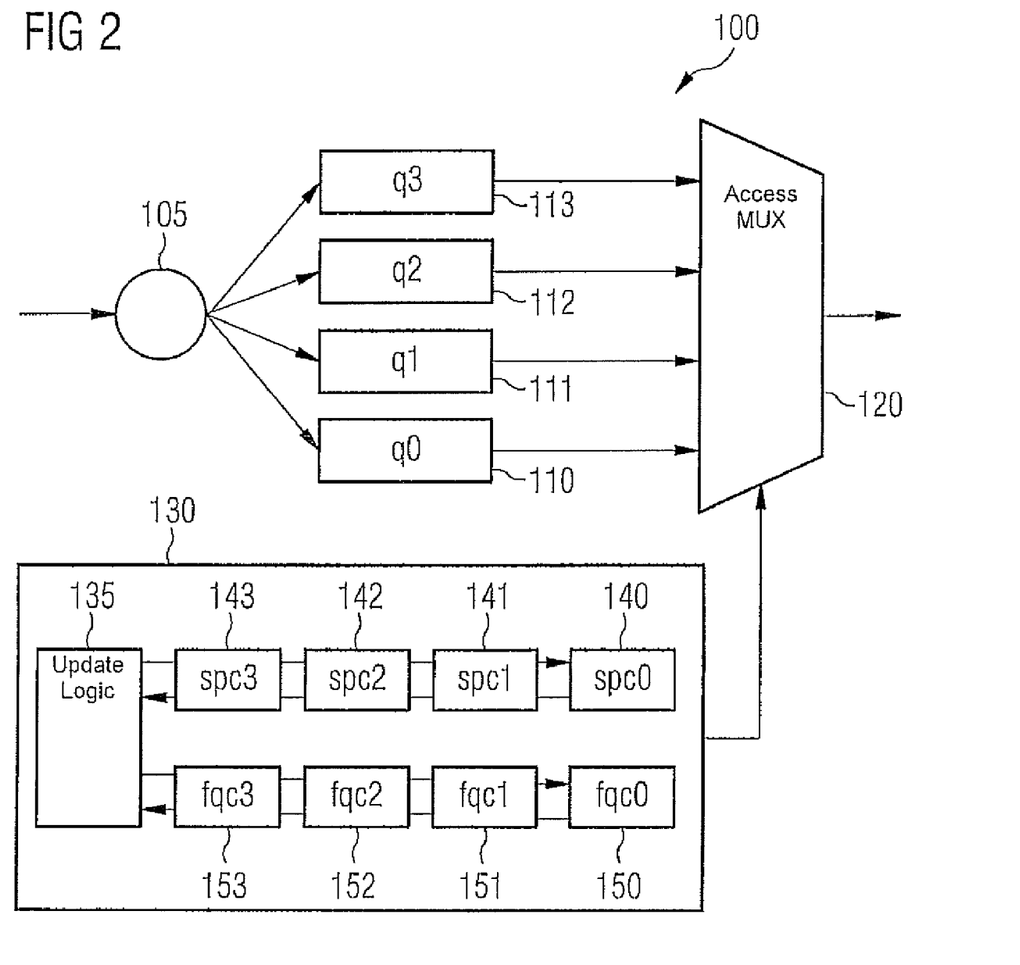
FIG. 2 schematically represents a bandwidth control device according to an embodiment of the invention.

FIG. 2 schematically illustrates an exemplary embodiment of a bandwidth control device 100, as for example used in the communication device 10.

The bandwidth control device 100 comprises a classification stage 105 to receive incoming or ingress data and to classify the data according to their type into a plurality of queues 110, 111, 112, 113. In the illustrated embodiment, a total number of four queues is provided, i.e. a q0-queue 110, a q1-queue 111, a q2-queue 112, and a q3-queue 113. The queues store data to be transmitted via an outgoing data port, e.g. the data port 24 of the communication device 10. For this purpose, an output of each of the queues 110, 111, 112, 113 is supplied to an access multiplexer 120 which is configured to select for which of the queues 110, 111, 112, 113 access is granted to the data port. The access multiplexer 120 is controlled by a control signal generated by a scheduling device 130.

As illustrated, the scheduling device 130 comprises a plurality of counters 140, 141, 142, 143, 150, 151, 152, 153. In particular, the scheduling device 130 comprises, for each of the queues 110, 111, 112, 113, a corresponding counter 140, 141, 142, 143 to count strict priority tokens, and a corresponding counter 150, 151, 152, 153 to count fair queuing tokens. That is to say, for the q0-queue 110, a first counter 140 is provided to count strict priority tokens, and a second counter 150 is provided to count fair queuing tokens. These counters will in the following also be referred to as spc0-counter and fpc0-counter, respectively. For the q1-queue 111, a first counter 141 is provided to count strict priority tokens and a second counter 151 is provided to count fair queuing tokens. In the following, these counters will also be referred to as spc1 counter and fpc1-counter, respectively. For the q2-queue 112, a first counter 142 is provided to count strict priority tokens, and a second counter 152 is provided to count fair queuing tokens. In the following, these counters will also be referred to as spc2-counter and fpc2-counter, respectively. For the q3-queue, a first counter 143 is provided to count strict priority tokens, and a second counter 153 is provided to count fair queuing tokens. In the following, these counters will also be referred to as spc3-counter and fpc3-counter, respectively. The first counters 140, 141, 142, 143 substantially form a strict priority section or strict priority apparatus of the bandwidth control device 100, and the second counters 150, 151, 152, 153 substantially form a fair queuing section or fair queuing apparatus of the bandwidth control device 100.

Further, the scheduling device 130 comprises an update logic 135, which regularly updates the first counters 140, 141, 142, 143 and the second counters 150, 151, 152, 153. For this purpose, the scheduling logic 135 supplies a respective update signal to the first counters 140, 141, 142, 143 and to the second counters 150, 151, 152, 153. For example, the counters may be implemented as 18-bit counters.

The update logic 135 is configured to control the update rates of the first counters 140, 141, 142, 143 and of the second counters 150, 151, 152, 153 according to the respective counter level. For this purpose, the update logic 135 is coupled to the first counters 140, 141, 142, 143 and to the second counters 150, 151, 152, 153 to receive a respective counter level signal. As will be further explained below, the update logic 135 is configured to reduce the update rate of the first counters 140, 141, 142, 143 and of the second counters 150, 151, 152, 153 as the counter level increases. By this means, overflowing of the counters can be avoided.

In the following, a method of generating the control signal for the access multiplexer 120 will be explained. The control signal is generated on the basis of the first counters 140, 141, 142, 143 and of the second counters 150, 151, 152, 153. The queues 110, 111, 112, 113 are provided with a fixed priority. For the following explanations, it will be assumed that the q3-queue 113 has the highest priority, that the q2-queue 112 has a higher priority than the q1-queue 111 and the q0-queue 110, and that the q1-queue 111 has a higher priority than the q0-queue 110. The q3-queue 113 may be provided to serve VoIP data packets, whereas the other queues 110, 111, 112 may be provided to serve other types of IP data packets.

A bandwidth is assigned to each of the queues on the basis of the strict priority scheme. For example, on the basis of the strict priority scheme, a bandwidth of 20 Mb/s may be assigned to the q0-queue 110 and to the q1-queue 111. A bandwidth of 10 Mb/s may be assigned to the q2-queue 112 and to the q3-queue 113. If the first counters 140, 141, 142, 143 are based on bytes, this is accomplished by updating these counters with a respective update rate corresponding to the bandwidth assigned on the basis of the strict priority scheme. In the present example, this means that the spc0-counter 140 is updated corresponding to 20 Mb/s, that the spc1-counter 141 is updated corresponding to 20 Mb/s, that the spc2-counter 142 is updated corresponding to 10 Mb/s, and that the spc3-counter 143 is updated corresponding to 10 Mb/s.

Further, additional bandwidth is assigned to each of the queues 110, 111, 112, 113 on the basis of the fair queuing scheme. For example, a bandwidth of 30 Mb/s may be assigned to each of the queues 110, 111, 112, 113. However, it is also possible to assign different bandwidths to the queues 110, 111, 112, 113, i.e. to assign a "weight" to the queues.

For controlling access to the data port via the access multiplexer 120, the queues 110, 111, 112, 113 are processed in a cyclic manner. Starting from the highest priority queue, i.e. from the q3-queue 113, the counter level of the first counters 140, 141, 142, 143 are checked. If for one of the queues the queue is not empty and the respective counter level is larger than a predetermined value, e.g. larger than zero, access to the data port is provided for the queue and the respective counter level is decreased by a number corresponding to the amount of transmitted data. The method then restarts from the queue having the highest priority.

If for none of the queues 110, 111, 112, 113 the first counter 140, 141, 142, 143 has a counter level above the predetermined threshold value, the method then turns to the fair queuing scheme using the second counters 150, 151, 152, 153. Starting from one of the queues, e.g. from the q3-queue 113, it is checked if the queue is not empty, the counter level of the respective second counter 150, 151, 152, 153 is above a predetermined threshold value, e.g. above zero, and if the corresponding counter level is larger than the counter levels of the second counters of the other queues. That is to say, access to the data port is provided for that queue 110, 111, 112, 113 for which the second counter 150, 151, 152, 153 has the maximum value and exceeds the predetermined threshold value. In this way, bandwidth is fairly distributed among the queues 110, 111, 112, 113.

According to an embodiment, for each of the queues 110, 111, 112, 113, the first counters 140, 141, 142, 143 and the second counters 150, 151, 152, 153 may be individually enabled or disabled. In this way, it can be selected for each of the queues to operate either with both of the above-described scheduling levels or to use only one of them.

Figure 3:
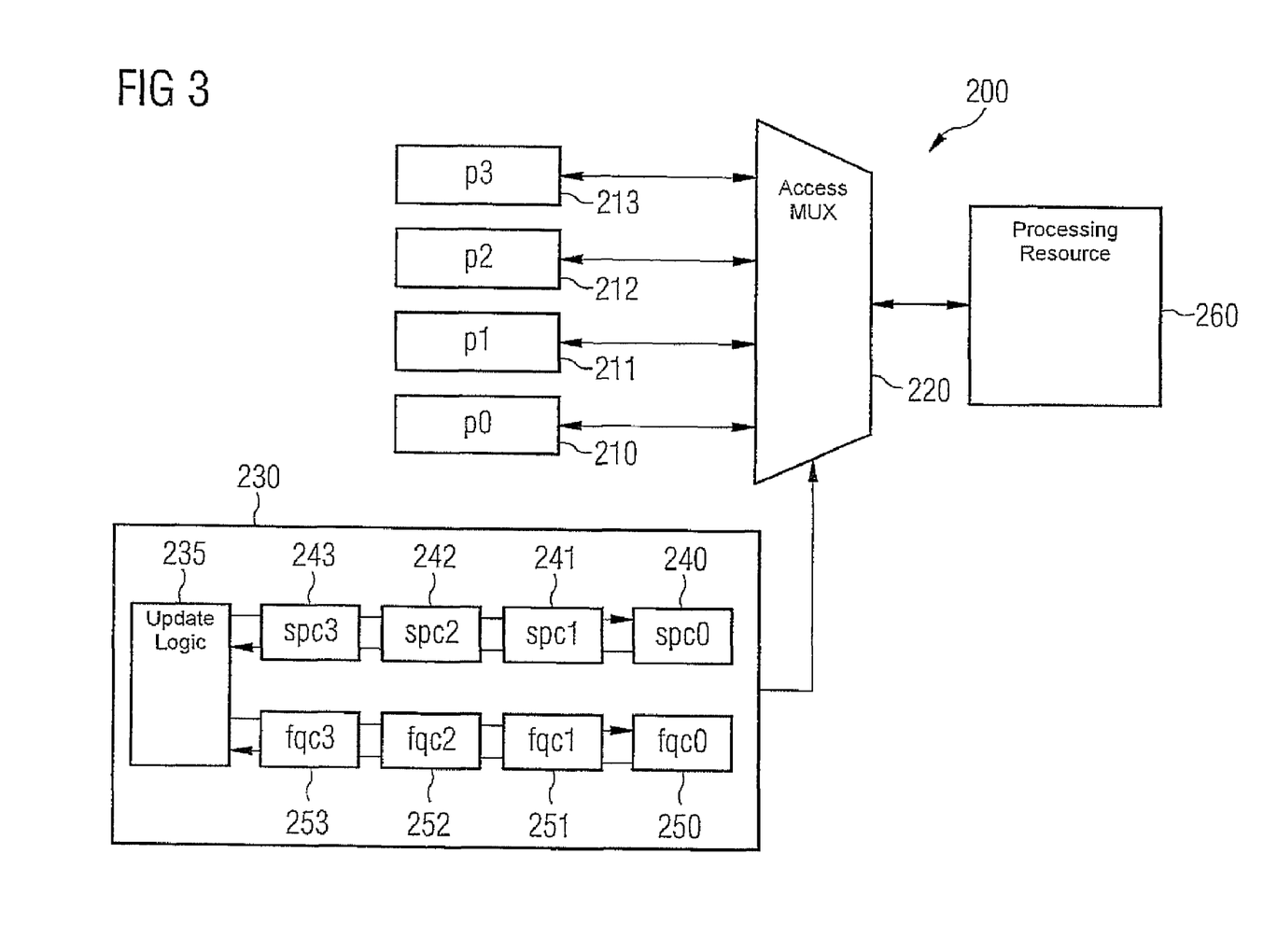
FIG. 3 schematically represents a bandwidth control device according to a further embodiment of the invention.

FIG. 3 schematically illustrates a bandwidth control device 200 according to a further exemplary embodiment of the invention. In this embodiment, bandwidth control is used to arbitrate between different processes sharing the same processing resource.

As illustrated in FIG. 3, a plurality of processes 210, 211, 212, 213, e.g. different software modules or program codes, share the same processing resource 260, e.g. a microprocessor or the like. For this purpose, an access multiplexer 220 is provided. In the illustrated example, a total number of four processes is provided, i.e. a p0 process 210, a p1 process 211, a p2 process 212, and a p3 process 213. In other embodiments, different numbers or processes may be provided. The processes 210, 211, 212, 213 may also be regarded as process queues.

The bandwidth control device 200 further comprises a scheduling device 230, which generally corresponds to the scheduling device 130 of FIG. 2. In particular, the scheduling device 230 comprises a plurality of counters 240, 241, 242, 243, 250, 251, 252, 253. For the p0-process 210 a first counter 240 is provided to count strict priority tokens, and a second counter 250 is provided to count fair queuing tokens. In the following, these counters will also be referred to as spc0-counter 240 and fqc0-counter 250, respectively. For the p1-process 211, a first counter 241 is provided to count strict priority tokens, and second counter 251 is provided to count fair queuing tokens. In the following, these counters will also be referred to as spc1-counter and fqc1 counter, respectively. For the p2-process 212, a first counter 242 is provided to count strict priority tokens, and a second counter 252 is provided to count fixed priority tokens. In the following, these counters will also be referred to as spc2-counter and fqc2-counter, respectively. For the p3-process 213, a first counter 243 is provided to count strict priority tokens, and a second counter 253 is provided to count fair queuing tokens. In the following, these counters will also be referred to as spc3-counter and fqc3-counter, respectively. The first counters 240, 241, 242, 243 substantially form a strict priority section of the bandwidth control device, and the second counters 250, 251, 252, 253 substantially form a fair queuing section of the bandwidth control device 200.

The scheduling device 230 further comprises an update logic 235 which generally corresponds to the update logic 135 of FIG. 2 and controls the respective update rates of the counters 240, 241, 242, 243, 250, 251, 252, 253 in response to the respective counter level. In particular, the update logic 235 may be configured to reduce the respective update rate as the counter level increases.

As compared to the bandwidth control device 100 of FIG. 2, in the embodiment of FIG. 3, the counters 240, 241, 242, 243, 250, 251, 252, 253 may be based on processor operations, and the update rates may then correspond to processing bandwidths, e.g. measured in processing operations per second. Otherwise, the process of controlling access of the processes 210, 211, 212, 213 to the processing resource 260 is the same as explained in connection with FIG. 2 for the queues 110, 111, 112, 113.

Figure 4:
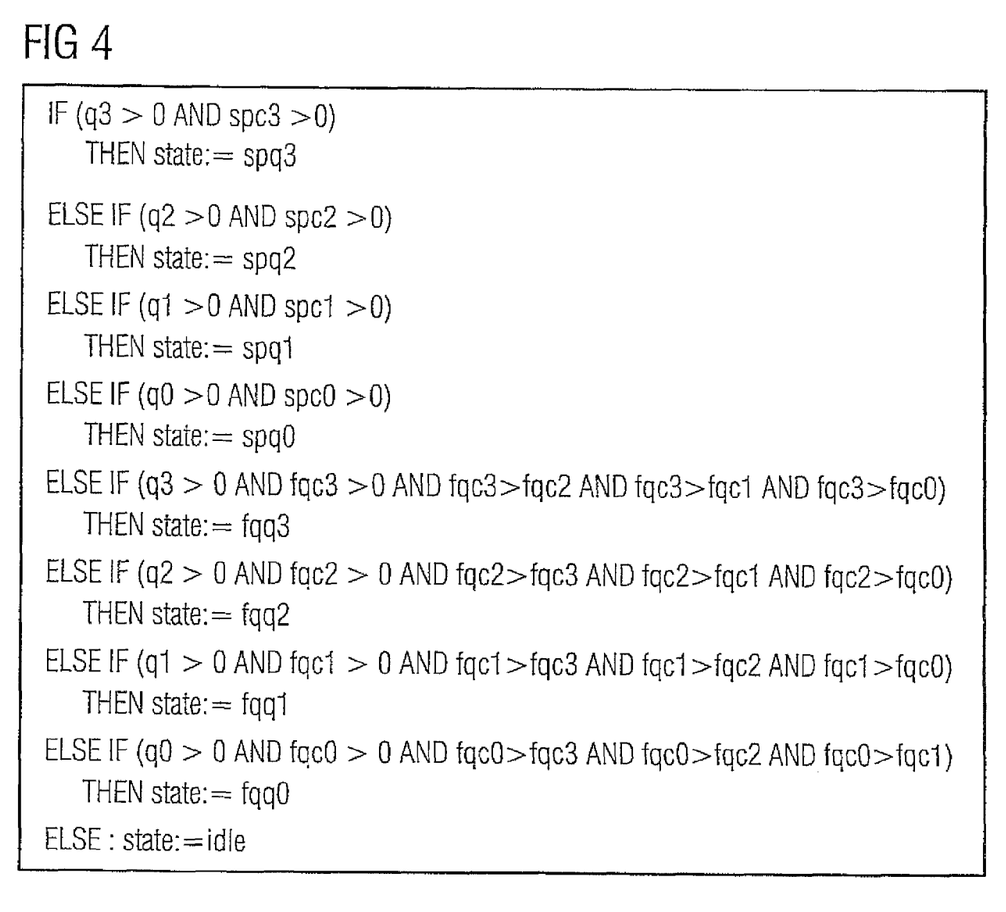
FIG. 4 shows a pseudo-code representation of a bandwidth control method according to an embodiment of the invention.

FIG. 4 shows a pseudo-code implementation of the bandwidth control method as explained in connection with FIG. 2. The method starts with the fixed priority scheme and with the highest priority queue, i.e. with the q3-queue.

In a first step, it is checked if the q3-queue is not empty and if the counter level of the spc3-counter is larger than zero (in the figure denoted by q3>0 AND spc3>0). If this is the case, access is provided for the q3-queue, the spc3-counter is decreased by a number corresponding to the amount of transmitted data, and the present cycle is terminated (in the figure denoted by state:=spq3).

Otherwise, the method continues with the next step. In the next step, it is checked if the q2-queue is not empty and if the counter level of the spc2-counter is larger than zero (in the figure denoted by q2>0 AND spc2>0). If this is the case, access is provided for the q2-queue, the spc2-counter is decreased by a number corresponding to the amount of transmitted data, and the present cycle is terminated (in the figure denoted by state:=spq2).

Otherwise, the method continues with the next step. In the next step, it is checked if the q1-queue is not empty and the counter level of the spc1-counter is larger than zero (in the figure denoted by q2>0 AND spc1>0). If this is the case, access is provided for the q1-queue, the spc1-counter is decreased by a number corresponding to the amount of transmitted data, and the present cycle is terminated (in the figure denoted by state:=spq1).

Otherwise, the method continues with the next step. In the next step, it is checked if the q0-queue is not empty and the counter level of the spc0-counter is larger than zero (in the figure denoted by q0>0 AND spc0>0). If this is the case, access is provided for the q0-queue, the spc0-counter is decreased by a number corresponding to the amount of transmitted data, and the present cycle is terminated (in the figure denoted by state:=spq0).

Otherwise, the method continues with the next step and turns to the fair queuing scheme. In the next step, it is checked if the q3-queue is not empty, if the counter level of the fpc3-counter is larger than zero, and if the counter value of the fqc3-counter is larger than the counter value of the fqc2-counter, of the fqc1-counter and of the fqc0-counter (in the figure denoted by q3>0 AND fqc3>0 AND fqc3>fqc2 AND fqc3>fqc1 AND fqc3>fqc0). If this is the case, access is provided for the q3-queue, the fqc3-counter is decreased by a number corresponding to the amount of transmitted data, and the present cycle is terminated (in the figure denoted by state:=fqq3).

Otherwise, the method continues with the next step. In the next step, it is checked if the q2-queue is not empty and if the counter level of the fqc2-counter is larger than zero and if the counter level of the fqc2-counter is larger than that of the fqc3-counter, of the fqc1-counter and of the fqc0-counter (in the figure denoted by q2>0 AND fqc2>0 AND fqc2>fqc3 AND fqc2>fqc1 AND fqc2>fqc0). If this is the case, then access is provided for the q2-queue, the fqc2-counter is decreased by a number corresponding to the amount of transmitted data, and the present cycle is terminated (in the figure denoted by state:=fqq2).

Otherwise, the method continues with the next step. In the next step, it is checked if the q1-queue is not empty, the counter level of the fqc1 counter is larger than zero, and the counter level of the fqc1 counter is larger than that of the fqc3-counter, of the fqc2-counter, and of the fqc0-counter (in the figure denoted by q1>0 AND fqc1>0 AND fqc1>fqc3 AND fqc1>fqc2 AND fqc1>fqc0). If this is the case, access is provided for the q1-queue, the fqc1-counter is decreased by a number corresponding to the amount of transmitted data, and the present cycle is terminated (in the figure denoted by state:=fqq1).

Otherwise, the method continues with the next step. In the next step, it is checked if the q0-queue is not empty, the counter level of the fqc0-counter is larger than zero, and the counter level of the fqc0-counter is larger than that of the fqc3-counter, of the fqc2-counter, and of the fqc1-counter (in the figure denoted by q0>0 AND fqc0>0 AND fqc0>fqc3 AND fqc0>fqc2 AND fqc0>fqc1). If this is the case, then access is provided for the q0-queue, the fqc0-counter is decreased by a number corresponding to the amount of transmitted data, and the present cycle is terminated (in the figure denoted by state:=fqq0).

Otherwise, the method continues with the next step. In the next step, the bandwidth control device is set into an idle state (in the figure denoted by state:=idle). This will occur if all of the fqc3-counter, the fqc2-counter, the fqc1-counter, and the fqc0-counter are zero, i.e. the maximum bandwidth is used. By bringing the bandwidth control device into an idle state, a maximum bandwidth limitation is realized.

As can be seen from the above description of the pseudo-code representation of FIG. 4, in the described method, first guaranteed bandwidth requirements are fulfilled on the basis of the strict priority scheme. Once all of the spc3-counter, the spc2-counter, the spc1-counter, and the spc0-counter are zero, the method turns to the fair queuing scheme on the basis of the fqc3-counter, the fqc2-counter, the fqc1-counter, and the fqc0-counter. In this state, additional available bandwidth is shared among the queues. In general, the above-described implementation of the fair queuing scheme corresponds to a round-robin method. If different weights are assigned to the queues using the update rates, the above-explained fair queuing scheme corresponds to a weighted round-robin method.

As already mentioned above, according to an embodiment, the update rates of the first counters and of the second counters are reduced as the counter level of the respective counter increases. By this means, a situation is addressed in which the physically allowed bandwidth is larger than the sum of the bandwidths assigned in the strict priority scheme and in the fair queuing scheme. In such a situation, the second counters, i.e. the counters to count the fair queuing tokens, would eventually be full, i.e. reach their maximum value. In this case, it would not be possible to select that queue in which the counter level has the largest value as described above. Such a situation can be avoided by reducing the update rate of the counters and the counter level increases. According to an embodiment, this is accomplished at least for the second counters. However, in other embodiments this may also be accomplished for the first counters or for both the first counters and the second counters.

Figure 5:
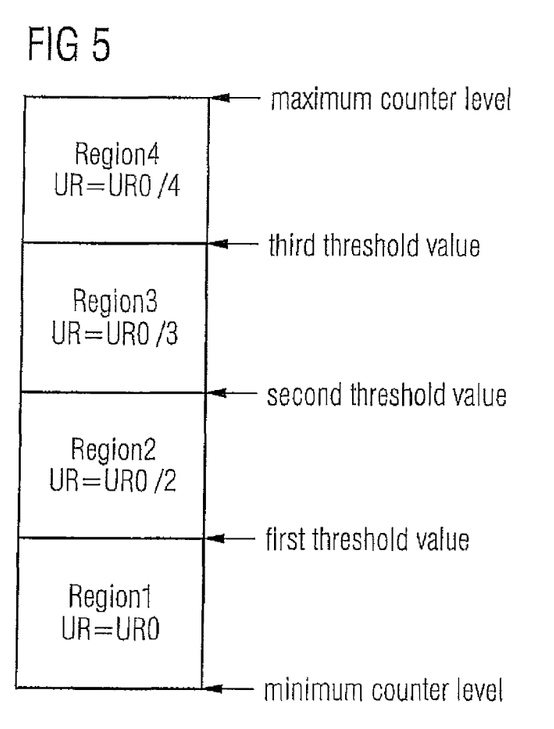
FIG. 5 schematically illustrates a method of adjusting the update rate of a counter according to an embodiment of the invention.
Figure 6:
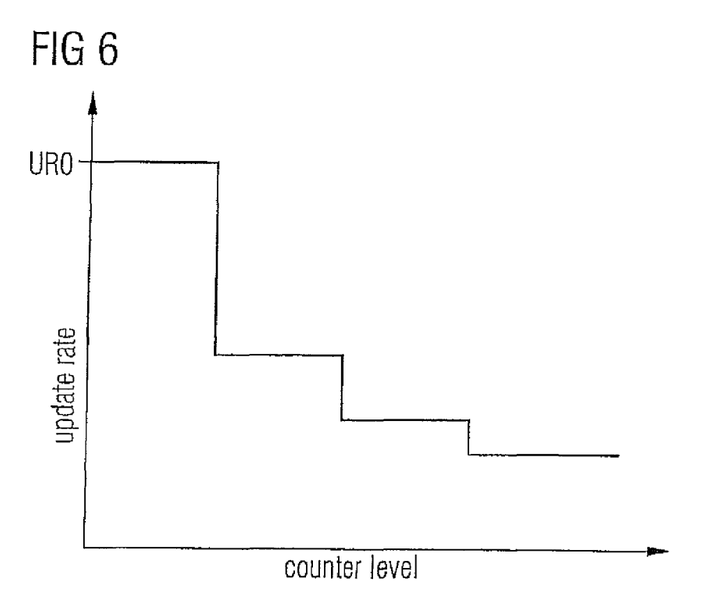
FIG. 6 schematically represents the update rate as a function of the counter level when using the adjustment method according to FIG. 5.

Referring to FIGS. 5 and 6, a method of reducing the update rates of the counters in response to the respective counter level will be further described with reference to an exemplary embodiment.

According to an embodiment, as illustrated in FIG. 5, the range of the counter level is divided into a plurality of regions. In the illustrated example, the total number of regions is four. However, according to other embodiments, different numbers of regions may be used. A first region, in the figure denoted by Region1, extends from a minimum counter level to a first threshold value. A second region, in the figure denoted by Region2, extends from the first threshold value to a second threshold value. A third region, in the figure denoted by Region3, extends from the second threshold value to a third threshold value. A fourth region, in the figure denoted by Region4, extends from the third threshold value to a maximum counter level. Accordingly, first to fourth regions of increasing counter values are defined.

A different update rate of the counter is associated with each of the regions. In the figure, the update rate is denoted by UR. The update rates in the different regions are defined with respect to a maximum update rate denoted by UR0. The maximum update rate is adjusted in response to the assigned bandwidth or weight of the queue, as described above.

According to the illustrated embodiment, in the first region, the maximum update rate is used, i.e. the update rate is selected as UR=UR0. In the second region, the update rate is selected as UR=UR0/2. In the third region, the update rate is selected as UR0/3. In the fourth region, the update rate is selected as UR=UR0/4. Accordingly, for the $k^{th}$ region, the update rate is selected as UR=UR0/k. In other embodiments, this approach may be extended to arbitrary numbers of regions.

In the illustrated embodiment, the regions are selected to have equal sizes, i.e. the first threshold value corresponds to ¼ of the maximum counter level, the second threshold value corresponds to ½ of the maximum counter level, and the third threshold value corresponds to ¾ of the maximum counter level. Accordingly, if this is generalized to an arbitrary number n of regions, the $k^{th}$ threshold value corresponds to k/n times the maximum counter level.

In other embodiments, the range of the counter level may be divided into regions in a different manner. For example, different sizes may be used for the regions. Further, in other embodiments, the update rate may be reduced from one region to the next region in a different manner.

FIG. 6 schematically illustrates the update rate as a function of the counter level. As can be seen, the update rate decreases in a step-like manner from the maximum update rate UR0 and asymptotically approaches a value of zero. In this way, overflowing of the counter, i.e. the counter reaching its maximum counter level, can reliably be avoided. The asymptotic limit of the update rate can be approached as desired by increasing the number of regions into which the range of the counter value is divided. In practice, is has turned out that a number of four regions already provides good results for most applications. However, in specific applications, a larger number of regions and a further reduction of the update rate may be appropriate.

In the above, embodiments have been described which allow for an efficient control of bandwidth in various application fields, e.g. the transmission of data via a communication link or sharing of a processing resource by a plurality of processes. On the one hand, a guaranteed bandwidth can be provided for the queues or processes. On the other hand, it is possible to also take into account situations in which the queues or processes require more bandwidth than the guaranteed bandwidth. Moreover, embodiments have been described which allow for the bandwidth control mechanisms to reliably operate even in cases of very small used bandwidth.

It is to be understood, that the present invention is not limited to the above-described exemplary embodiments. In particular, the above-described concepts may also be applied to other application fields in which sharing of a resource is involved. Various modifications may be made in the above-described embodiments. For example, the number of queues or processes may be varied, and different types of fair queuing schemes may be used in the second scheduling level. In particular, any suitable technique may be selected to assign weights to the queues in the fair queuing scheme. Finally, the above-described methods and devices may be used in different types of electronic equipment.

What is claimed is:

1. A method of bandwidth control, the method comprising:
providing a plurality of queues;
assigning via a communication device bandwidth to each of the queues on the basis of a strict priority scheme; and
assigning via a communication device additional bandwidth to the queues on the basis of a fair queuing scheme, wherein said assigning of bandwidth and said assigning of additional bandwidth is controlled on the basis of priority tokens;
providing, for each of the queues, a first counter configured to count strict priority tokens and a second counter configured to count fair queuing tokens,
updating each of the first and the second counters at a respective update rate;
controlling the update rate of the first counter and/or of the second counter based on respective counter levels of the first and the second counter; and
reducing the update rate as the counter level increases.

2. The method according to claim 1, comprising:
dividing a range of the counter level into first to $n^{th}$ regions of increasing counter level, and selecting update rates which progressively decrease from the first region to the $n^{th}$ region.

3. The method according to claim 2, wherein the update rate in a $k^{th}$ region is 1/k times the update rate in the first region.

4. The method according to claim 1, wherein the first counter and/or the second counter are based on bytes.

5. The method according to claim 1, wherein the fair queuing scheme is based on a round-robin method.

6. The method according to claim 5, wherein the fair queuing scheme is based on a weighted round-robin method.

7. The method according to claim 1, wherein the fair queuing scheme is a weighted fair queuing scheme.

8. A method of bandwidth control, the method comprising:
providing a plurality of queues;
assigning via a communication device bandwidth to each of the queues on the basis of a strict priority scheme; and
assigning via a communication device additional bandwidth to the queues on the basis of a fair queuing scheme, wherein said assigning of bandwidth and said assigning of additional bandwidth is controlled on the basis of priority tokens, and wherein the fair queuing scheme is a weighted fair queuing scheme;
providing, for each of the queues, a first counter configured to count strict priority tokens and a second counter configured to count fair queuing tokens,
updating each of the first and the second counters at a respective update rate;
controlling the update rate of the first counter and/or of the second counter based on respective counter levels of the first and the second counter;
providing a first counter to count strict priority tokens and a second counter to count fair queuing tokens; and
adjusting an update rate of the second counter on the basis of a weight of the queue.

9. The method according to claim 1, wherein the queues are configured to provide data to be transmitted via a communication link.

10. The method according to claim 1, wherein the queues are processing queues configured to provide operations to be carried out by a processing resource.

11. A bandwidth control device, comprising:
a strict priority apparatus configured to assign bandwidth to a plurality of queues based on a strict priority scheme;
a fair queuing apparatus configured to assign additional bandwidth to the plurality of queues based on a fair queuing scheme;
for each of the plurality of queues, the strict priority apparatus comprises a first counter configured to count strict priority tokens;
the fair queuing apparatus comprises a second counter configured to count fair queuing tokens;
a counter update logic coupled to the first counters and/or to the second counters, the counter update logic configured to receive a respective counter level signal from the first counters and/or from the second counters, and the counter update logic further configured to provide a respective counter update signal in response to the respective counter level signal; and
wherein the counter update logic is configured to provide the counter update signal corresponding to a respective update rate of the first counter and/or the second counter based on counter levels indicated by the respective counter level signals.

12. The bandwidth control device according to claim 11 wherein the first counter and the second counter are based on bytes.

13. The bandwidth control device according to claim 11, wherein the counter update logic is configured to decrease the update rate as the counter level increases.

14. The bandwidth control device according to claim 13, wherein the range of the counter level is divided into first to $n^{th}$ regions of increasing counter level, and
wherein the update rate in a $k^{th}$ region is 1/k times the update rate in the first region.

15. The bandwidth control device according to claim 11, wherein the plurality of queues are configured to provide data to be transmitted via a communication link.

16. The bandwidth control device according to claim 11, wherein the plurality of queues are processing queues configured to provide operations to be carried out by a processing resource.

17. A communication device, comprising:
a data port configured to transmit different types of data;
a classification stage configured to assign data to a plurality of queues according to their type; and
a bandwidth control device configured to arbitrate access of the plurality of queues to the data port, the bandwidth control device comprising,
a strict priority apparatus configured to assign bandwidth to the plurality of queues based on a strict priority scheme, and
a fair queuing apparatus configured to assign additional bandwidth to the plurality of queues based on a fair queuing scheme,
wherein, for each of the plurality of queues, the strict priority apparatus comprises a first counter configured to count strict priority tokens, and the fair queuing apparatus comprises a second counter configured to count fair queuing tokens, and
a counter update logic configured to control a respective update rate of the first counter and/or of the second counter based on respective counter levels of the first counter and the second counter,
wherein the counter update logic is configured to reduce the update rate as the counter level increases.

* * * * *